United States Patent
Carofiglio et al.

(10) Patent No.: US 11,546,398 B1
(45) Date of Patent: Jan. 3, 2023

(54) REAL-TIME TRANSPORT (RTC) WITH LOW LATENCY AND HIGH SCALABILITY

(71) Applicant: Cisco Technology, Inc., San Jose, CA (US)

(72) Inventors: Giovanna Carofiglio, Paris (FR); Jacques Olivier Samain, Paris (FR); Michele Papalini, Issy les Moulineaux (FR); Giulio Grassi, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/690,136

(22) Filed: Mar. 9, 2022

(51) Int. Cl.
*H04L 65/613* (2022.01)
*H04L 41/5051* (2022.01)
*H04L 1/00* (2006.01)
*H04L 65/80* (2022.01)

(52) U.S. Cl.
CPC .......... *H04L 65/613* (2022.05); *H04L 1/0042* (2013.01); *H04L 41/5051* (2013.01); *H04L 65/80* (2013.01)

(58) Field of Classification Search
CPC . H04L 65/613; H04L 1/0042; H04L 41/5051; H04L 65/80
See application file for complete search history.

(56) References Cited

U.S. PATENT DOCUMENTS

| | | | |
|---|---|---|---|
| 9,088,510 B2 | 7/2015 | Li et al. | |
| 10,880,315 B1* | 12/2020 | Carofiglio | H04L 65/80 |
| 11,038,899 B1 | 6/2021 | Carofiglio et al. | |

(Continued)

FOREIGN PATENT DOCUMENTS

WO 2020187768 9/2020

OTHER PUBLICATIONS

Papalini, et al., "On the Scalability of WebRTC with Information-Centric Networking", 2020 IEEE International Symposium on Local and Metropolitan Area Networks (LANMAN), Jul. 2020, 6 pages, IEEE, Orlando, Florida.

(Continued)

*Primary Examiner* — Oanh Duong
(74) *Attorney, Agent, or Firm* — Behmke Innovation Group LLC; James M. Behmke; Jonathon P. Western (57) ABSTRACT

In one embodiment, a device obtains traffic for an application to be sent to a plurality of hybrid Information-Centric Networking clients. The device divides the plurality of hybrid Information-Centric Networking clients into active hybrid Information-Centric Networking clients and passive hybrid Information-Centric Networking clients, based in part on whether a given hybrid Information-Centric Networking client is sharing content with the plurality of hybrid Information-Centric Networking clients via the application. The device sends, to the active hybrid Information-Centric Networking clients, the traffic using a first transport mechanism that guarantees a level of end-to-end latency between the device and the active hybrid Information-Centric Networking clients. The device sends, to the passive hybrid Information-Centric Networking clients, the traffic using a second transport mechanism that does not guarantee the level of end-to-end latency between the device and the passive hybrid Information-Centric Networking clients.

20 Claims, 8 Drawing Sheets

(56) References Cited

U.S. PATENT DOCUMENTS

| | | | |
|---|---|---|---|
| 11,095,702 | B2 | 8/2021 | Papalini et al. |
| 11,218,711 | B2* | 1/2022 | White ............... H04N 19/39 |
| 11,405,448 | B1* | 8/2022 | Seigneurbieux ...... H04L 65/403 |
| 2012/0329751 | A1 | 12/2012 | Baker et al. |
| 2014/0177482 | A1* | 6/2014 | Crinon ............... H04L 65/4038 370/260 |
| 2018/0227390 | A1* | 8/2018 | Reznik ................ H04L 67/568 |
| 2019/0089642 | A1* | 3/2019 | Srinivasan .......... H04L 43/087 |
| 2019/0327169 | A1* | 10/2019 | Alam ................. H04L 45/306 |
| 2020/0204605 | A1 | 6/2020 | Papalini et al. |

OTHER PUBLICATIONS

Grozev, et al., "Experimental Evaluation of Simulcast for WebRTC," IEEE Communications Standards Magazine ( vol. 1, Issue: 2, 2017), Jul. 2017, pp. 52-59, IEEE.

Jacobson, et al., "Networking Named Content", CoNEXT'09, Dec. 1-4, 2009, 12 pages, ACM, Rome, Italy.

Samain, et al., "Dynamic Adaptive Video Streaming: Towards a Systematic Comparison of ICN and TCP/IP", IEEE Transactions on Multimedia ( vol. 19, Issue: 10, Oct. 2017), Jul. 2017, pp. 2166-2181, IEEE.

Chakraborti, et al., "ICN Based Scalable Audio-Video Conferencing on Virtualized Service Edge Router (VSER) Platform", ACM-ICN '15: Proceedings of the 2nd ACM Conference on Information-Centric Networking, Sep. 2015, pp. 217-218, ACM.

Jangam, et al., "Realtime Multi-party Video Conferencing Service over Information Centric Network", 2015 IEEE International Conference on Multimedia & Expo Workshops (ICMEW), Jul. 2015, 6 pages, IEEE, Turin, Italy.

Zhang, et al., "VR Video Conferencing over Named Data Networks", VR/AR Network '17: Proceedings of the Workshop on Virtual Reality and Augmented Reality Network, Aug. 2017, pp. 7-12, ACM.

Ivov, et al., "A Real-time Transport Protocol (RTP) Header Extension for Mixer-to-Client Audio Level Indication", Request for Comments: 6465, Dec. 2011, 15 pages, IETF Trust.

Grozev, et al., "Last n: Relevance-based selectivity for forwarding video in multimedia conferences", NOSSDAV'15, Mar. 18-20, 2015, 7 pages, ACM, Portland, OR, USA.

Ott, et al., "Extended RTP Profile for Real-time Transport Control Protocol (RTCP)-Based Feedback (RTP/AVPF)", Request for Comments: 4585, Jul. 2006, 51 pages, The Internet Society.

Carofiglio, et al., "Leveraging ICN In-network Control for Loss Detection and Recovery in Wireless Mobile Networks", Proceedings of the 3rd ACM Conference on Information-Centric Networking, Sep. 2016, 10 pages, ACM.

Compagno, et al., "To NACK or not to NACK? Negative Acknowledgments in Information-Centric Networking", 2015 24th International Conference on Computer Communication and Networks (ICCCN), Mar. 2015, 10 pages.

Carofiglio, et al., "Enabling ICN in the Internet Protocol: Analysis and Evaluation of the Hybrid-ICN Architecture", ICN '19, Sep. 24-26, 2019, pp. 55-66, ACM, Macao, China.

"HICN", online: https://wiki.fd.io/view/HICN, Mar. 27, 2020, accessed Feb. 10, 2022, 4 pages, FD.io.

"Jitsi Video Conferencing Software", online: https://jitsi.org/, accessed Feb. 17, 2022, 3 pages, 8x8, Inc.

"WebRTC Library", online: https://webrtc.googlesource.com/, accessed Feb. 17, 2022, 1 page.

"Vector Packet Processing—One Terabit Software Router", online: https://fd.io/docs/whitepapers/FDioVPPwhitepaperJuly2017.pdf, accessed Feb. 17, 2022, 21 pages.

"SeleniumHQ Browser Automation", online: https://docs.seleniumhq.org, accessed Feb. 17, 2022, 3 pages.

"Linux Containers", online: https://linuxcontainers.org, accessed Feb. 17, 2022, 3 pages.

"Jitsi Meet Torture", online: https://github.com/jitsi/jitsi-meet-torture/, accessed Feb. 17, 2022, 4 pages.

Jacobson, et al., "VoCCN: Voice-over Content-centric Networks", ReArch '09: Proceedings of the 2009 workshop on Re-architecting the internet, Dec. 2009, 6 pages, ACM, Rome, Italy.

Zhu, et al., "ACT: Audio Conference Tool over Named Data Networking", ICN '11: Proceedings of the ACM SIGCOMM workshop on Information-centric networking, Aug. 2011, pp. 68-73, ACM, Toronto, Ontario, Canada.

GUSEV et la., "NDN-RTC: Real-Time Videoconferencing over Named Data Networking", ACM-ICN '15: Proceedings of the 2nd ACM Conference on Information-Centric Networking, Sep. 2015, 11 pages, ACM.

Mastorakis, et al., "Real-Time Data Retrieval in Named Data Networking", 2018 1st IEEE International Conference on Hot Information-Centric Networking (HotICN), Aug. 2018, IEEE, Shenzhen, China.

"Janus: the general purpose WebRTC server", online: https://janus.conf.meetecho.com/, accessed Mar. 3, 2022, 1 page.

* cited by examiner

REAL-TIME TRANSPORT (RTC) WITH LOW LATENCY AND HIGH SCALABILITY

TECHNICAL FIELD

The present disclosure relates generally to computer networks, and, more particularly, to real-time communication (RTC) with low latency and high scalability.

BACKGROUND

Real-time communication is challenging to scale as participating devices increase in terms of network resource usage because of stringent latency requirements that it imposes for interactivity. Current solutions provided by various protocols forward content, information, data, etc. to end users that are not actively participating in real-time communication sessions. In the end, these solutions necessarily introduce a measure of latency to content that is streamed to an end user. Additionally, these protocols require a server that provides audio/video encoding or decoding, where the server oftentimes has to distribute content in different formats.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device obtains traffic for an application to be sent to a plurality of hybrid Information-Centric Networking clients. The device divides the plurality of hybrid Information-Centric Networking clients into active hybrid Information-Centric Networking clients and passive hybrid Information-Centric Networking clients, based in part on whether a given hybrid Information-Centric Networking client is sharing content with the plurality of hybrid Information-Centric Networking clients via the application. The device sends, to the active hybrid Information-Centric Networking clients, the traffic using a first transport mechanism that guarantees a level of end-to-end latency between the device and the active hybrid Information-Centric Networking clients. The device sends, to the passive hybrid Information-Centric Networking clients, the traffic using a second transport mechanism that does not guarantee the level of end-to-end latency between the device and the passive hybrid Information-Centric Networking clients.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
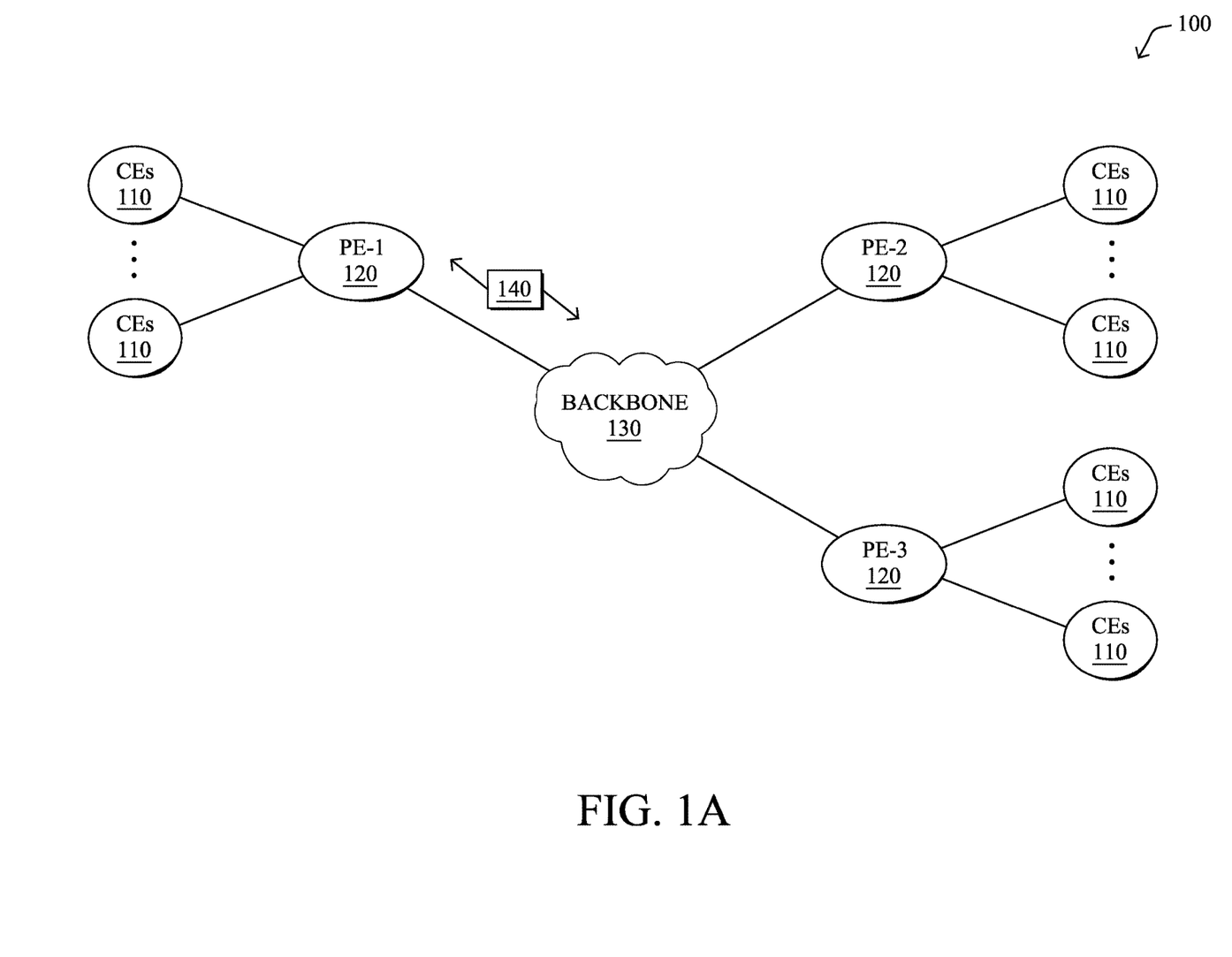
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
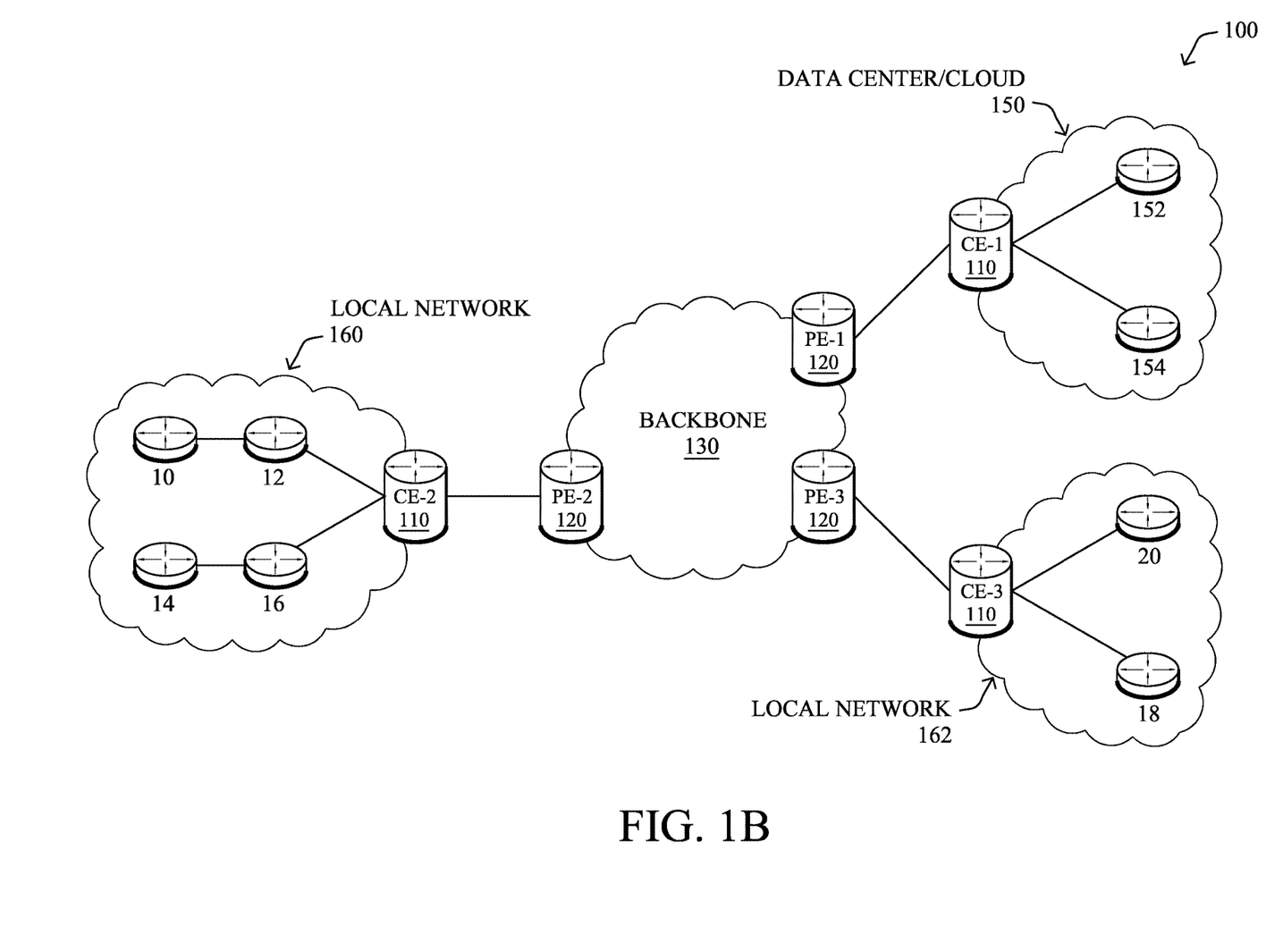

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
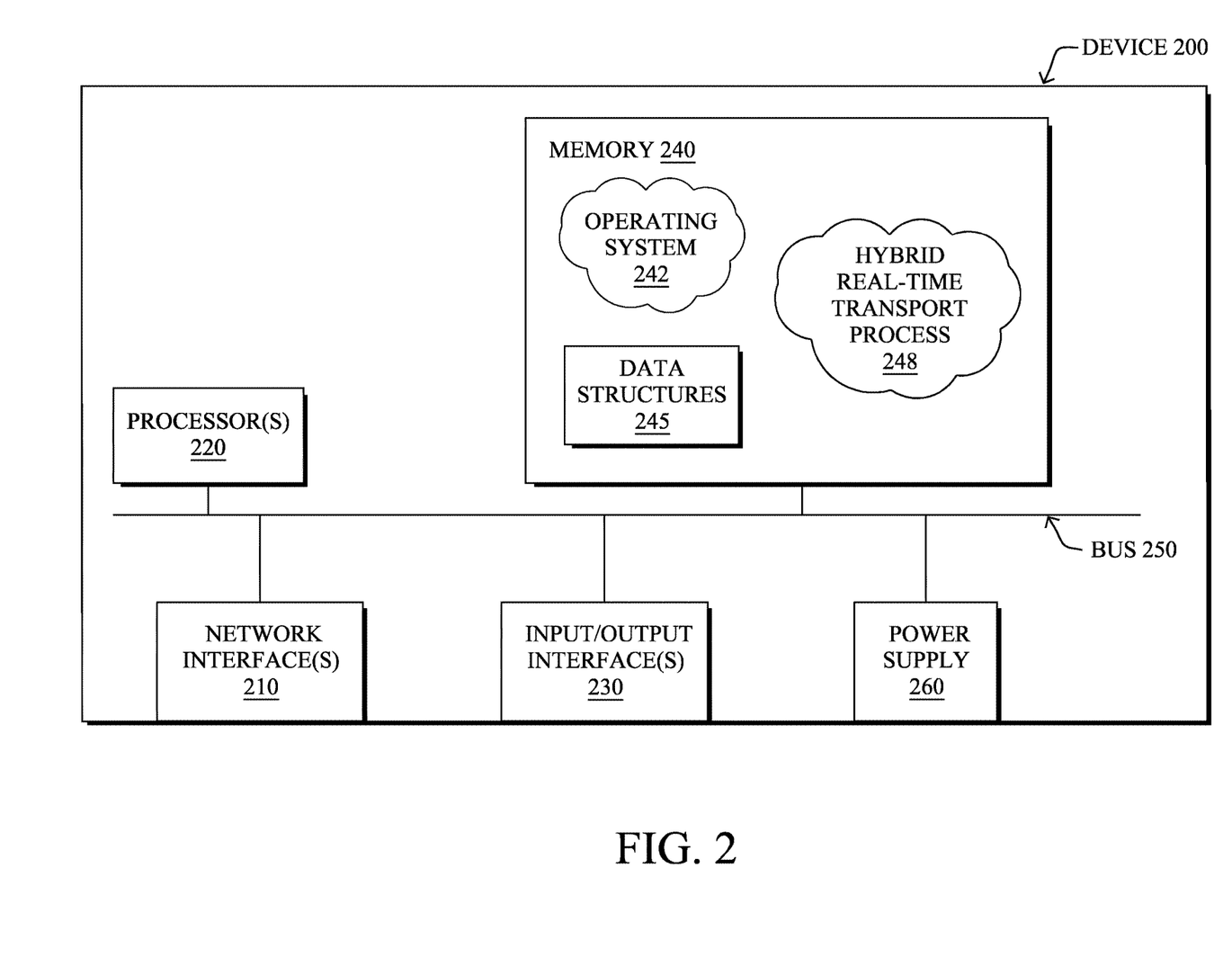
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, physical network interfaces 210 may also be used to implement one or more virtual network interfaces, such as for virtual private network (VPN) access, known to those skilled in the art. As is understood in the art, network interfaces 210 may comprise a plurality of network interfaces used for a variety of networking communication protocols, for example, Wi-Fi, cellular (LTE, 5G, etc.), Bluetooth, etc.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise hybrid real-time transport process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, real-time communication is conventionally costly to scale in terms of network resource usage because of stringent latency requirements that this type of communication imposes for interactivity. Current solutions forward content, information, data, etc. to end users that are not actively participating in real-time communication sessions using protocols such as Dynamic Adaptive Streaming over HTTP (DASH) or HTTP Live Stream (HLS). Though these communication protocols, in some scenarios, scale well, they nonetheless still introduce a measure of latency to content that is streamed to an end user (e.g., streaming websites like Twitch™ effectively adds approximately 30 seconds to video streams that it provides to end users). Additionally, these protocols require a server that provides audio/video encoding or decoding, where the server distributes content in various formats (e.g., Real-time Transport (RTP) for real-time communications, DASH or HLS for streaming, etc.). This encoding or decoding generally adds additional load, in terms of computational, network resource, etc. usage, to a server that is configured to provide streaming content.

Figure 3:
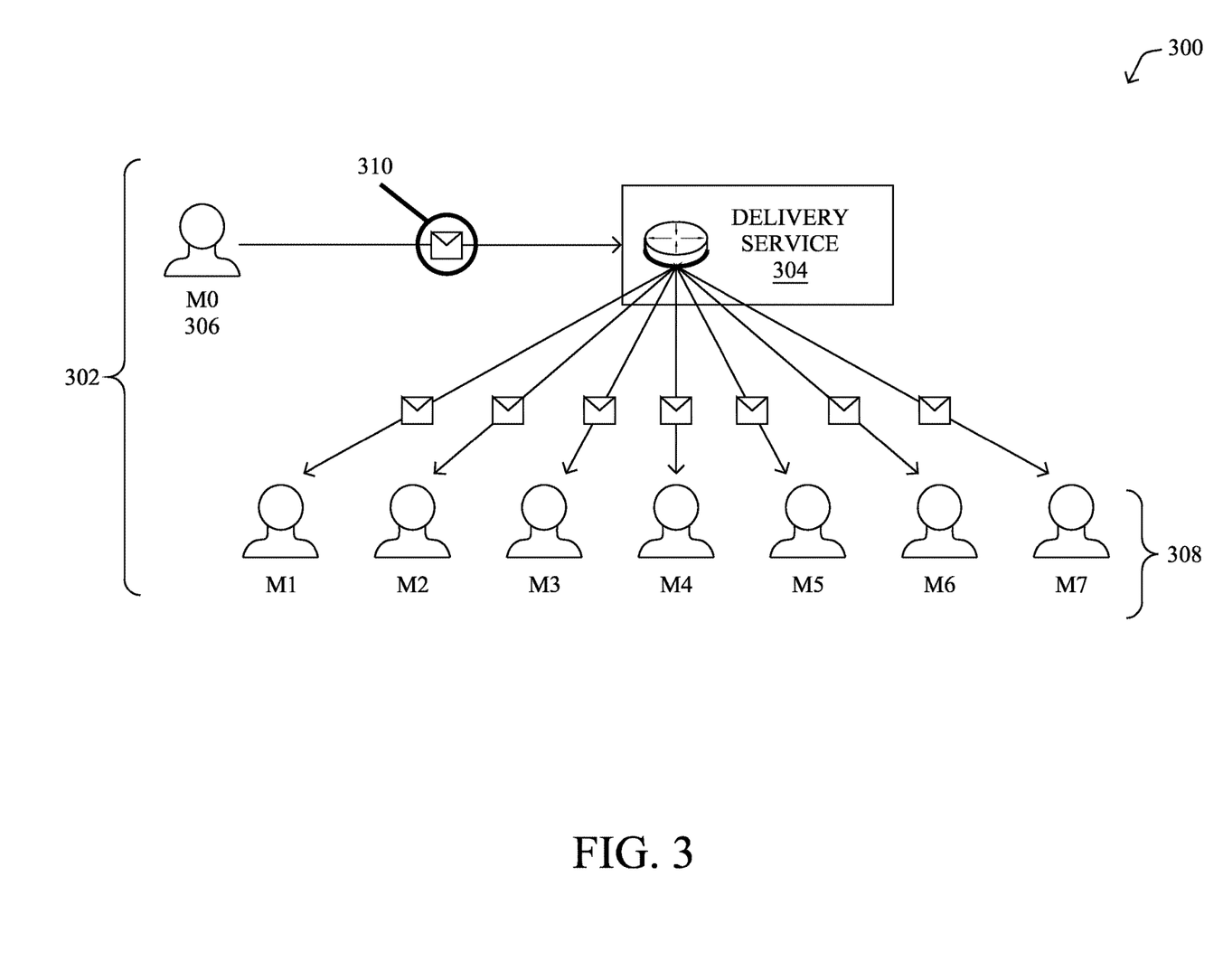
FIG. 3 illustrates an example architecture for devices using Hybrid Information-Centric Networking (hICN)

Hybrid Information-Centric Networking has been introduced to jointly provide reliable multicast communication support in a publisher/subscriber mode. Such support enables the ability to realize multicast groups under unicast IP transport conditions. For example, FIG. 3 illustrates an example architecture 300 for devices using Hybrid Information-Centric Networking (hICN). As shown, architecture 300 may include a plurality of group members 302 (e.g., comprising mobile devices like cellphones, tablets, etc.) that are configured to communicate with one another using hICN. hICN, generally, is an architecture that brings information-centric networking into Internet Protocol version 6 (IPv6), and, by doing so, enables generalization of IPv6 networking by using location-independent name-based networking. This may be enabled at either a network layer and/or at a transport layer by also providing name-based sockets to applications. By reusing and extending existing IPv6 protocols and architectures, hICN provides deployable hybrid solutions that are tailored to various use cases and application needs.

Each of plurality of group members 302 may be equipped, configured, etc. with one or more hICN transport services, for example, by using one or more application programming interface (APIs) (e.g., producer-consumer, publisher-subscriber, push-pull, etc.). That is, a producer/publisher (e.g., over a communication socket) may be implemented such that it binds a name prefix, where the name prefix may be used to pull data, information, etc. by consumers/subscribers (e.g., over a communication socket). Generally, an hICN name prefix may be an internet protocol version 6 (IPv6) address number, as defined in hICN. Further, an hICN name prefix is understood to be a location independent name (topic, data identifier, etc.) that hides network topologies details to both consumers and producers (e.g., among plurality of group members 302). Content that may be published from one group member to the other group members may include various or streams, including audio and/or video streams, teleconference information, a commit message that is used to update group membership or create Messaging Layer Security (MLS) groups, application messages, etc.

In the example shown in FIG. 3, delivery service 304 may be configured to use a hICN based broadcast service that is configured to publish content from group member 306 to group members 308. Similarly, group members 308 may be equipped, configured, etc. with one or more hICN transport services, for example, by using one or more APIs. It is, however, contemplated that for certain hICN applications do not require delivery service 304 and that requests may be sent from each of group members 308 to group member 306 (and vice versa). In the example shown in FIG. 3, message 310 sent by group member 306 may include requested application information/data that is to be "pulled" directly from group members 308 or via delivery service 304.

Figure 4:
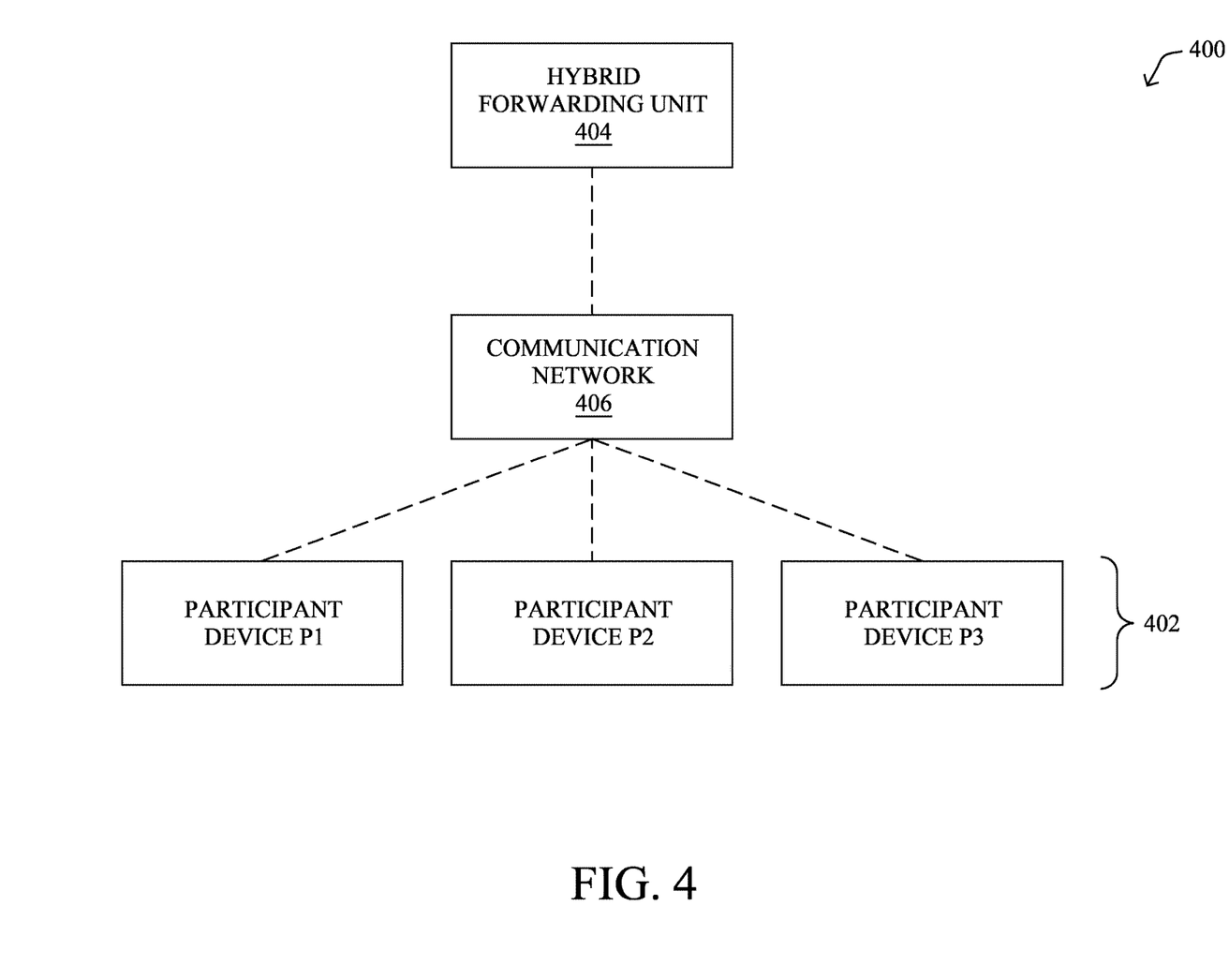
FIG. 4 illustrates an example architecture for devices using hICN and real-time communication (RTC)

It is contemplated that hICN, in some conditions, may be well-suited for real-time communication. That is, hICN, may be implemented alongside a protocol such as WebRTC that includes a selective forwarding unit (SFU)-based architecture where transport layer communications are synchronized among "consumer" devices and "producer" devices. Particularly, with reference FIG. 4, an example hICN-RTC architecture 400 is shown. hICN-RTC architecture 400 includes a plurality of participant devices 402 (also referred to as "participants" or "clients" P1-P3) operated by/associated with respective users of the participant devices, and hybrid forwarding unit 404 configured to connect to, and communicate with, each of the participant devices over a communication network 406. Communication network 406 may include one or more wide area networks (WANs), such as the Internet, and one or more local area networks (LANs). Communication network 406 may also include an ICN network to which participant devices P1-P3 and hybrid forwarding unit 404 connect to communicate with each other.

hICN-RTC architecture 400 supports communication sessions between participant devices P1-P3, such as a conference between the users of the participant devices, in which the participant devices connect to hybrid forwarding unit 404 and exchange multimedia content with each other through hybrid forwarding unit 404. The multimedia content may include audio in the form of audio streams, video in the form of video streams, text, chat, and so on, associated with users of the participant devices. To this end, hybrid forwarding unit 404 operates as a central or intermediate network device/node for streaming of audio and video among plurality of participant devices 402 when connected to the hybrid forwarding unit. For example, a given participant device may send its associated audio stream and video stream to hybrid forwarding unit 404. Hybrid forwarding unit 404 may then decide which of the streams to forward to the remaining devices. This adds flexibility as hybrid forwarding unit 404 may decide to drop streams that are deemed not important and to forward only the important ones, such as the streams from "active speaker" participant devices (i.e., participant devices deemed to be associated with users of the participant devices who are active speakers/talkers) among the participant devices. The selection of which streams to forward may be achieved without any media processing at hybrid forwarding unit 404, to avoid inducing extra delay or processing at the hybrid forwarding unit 404 (or at plurality of participant devices 402).

hICN-RTC architecture 400 builds upon the WebRTC SFU-based architecture and adapts it to hICN by: (i) hICN integration at the participant devices (e.g., plurality of participant devices 402) and at the hybrid forwarding unit (e.g., hybrid forwarding unit 404), (ii) minimal modifications to the interaction with the application-layer, and (iii) implementing an RTC-tailored hICN transport protocol. In hICN-RTC, participant devices and the hybrid forwarding unit may include, for example: a) WebRTC application logic (e.g., encoding/decoding audio and video flows at the participant devices and forwarding streams without any transcoding operation at the hybrid forwarding unit); b) an hICN transport to carry video flows and/or audio flows between participant devices and the hybrid forwarding unit in hICN packets; and c) an hICN forwarder operating on hICN packets. hICN-RTC modifies the interaction between the application and the network transport to exploit aggregation and multicasting features of the underlying hICN network. It is contemplated that an ad-hoc hICN naming scheme and a new communication flow between participant devices and hybrid forwarding unit may be defined, which are transparent to a given WebRTC participant device (e.g., client) and hybrid forwarding unit application and/or device.

In accordance with the naming scheme, the video of/from each participant device (i.e., the video associated with a participant device in a conference) is named using (i) a participant specific name_prefix, e.g., /video/participant-1/ for video from participant device P1, and (ii) a set of pre-defined name_prefixes, e.g., /video/active-speaker-1/for participant device P1, /video/active-speaker-2/for participant device P2, . . . , /video/active-speaker-n/for participant device Pi, to name the video streams of (i.e., associated with) the "active speaker" participant devices associated with users who are active speakers in the conference. The communication between the hybrid forwarding unit 404 and a hICN-RTC enabled participant device works as follows: the hICN transport layer at hybrid forwarding unit pulls the video of the participant devices identified as being associated with users who are active speakers (i.e., from the active speaker participant devices), and re-names their video using the active speaker participant devices' name_prefixes. At the participant devices, the hICN transport layer pulls the video of the active speaker participant devices from the hybrid forwarding unit, using the active speaker participant devices name_prefixes, e.g., /video/active-speaker-1/. This approach allows a reduction in the overhead at the application for two reasons: (i) since all of the participant devices request the same set of videos through the hybrid forwarding unit, i.e., the videos of the active speaker participant devices, the requests from all of the participant devices are aggregated and satisfied by the hICN forwarder in the hybrid forwarding unit. Thus, only a small portion of requests reaches the hybrid forwarding unit application; and (ii) in hICN-RTC, the hybrid forwarding unit pulls only the video from the active speaker participant devices, rather than retrieving the video streams from all of the participant devices including active speaker participant devices and non-active speaker participant devices (e.g., associated with users who are not considered/determined to be active speakers) and dropping those belonging to the non-active speaker participant devices. Therefore, only the streams that are really needed are requested.

Real-Time Communication (RTC) with Low Latency and High Scalability

The techniques herein introduce mechanisms for real-time communication (RTC) with low latency and high scalability. A hICN-RTC architecture may be configured to implement a streaming mode that distinguishes between a real-time participant and a streaming participant in a given communication session using a single protocol, thereby providing scalability for sessions with both types of participants. Stated another way, the hICN-RTC architecture may adjust transmission parameters to conserve network resources by differentiating between types of users of an application into two groups, real-time users (e.g., a presenter of a videoconference) and streaming users (e.g., attendees of the video conferences) then tailoring network requirements of each type. When transport layer communications are synchronized among these types of devices, "consumer" devices receive content (e.g., streams) from "producer" devices without additional delay (apart from delay introduced by network conditions). Generally, a streaming mode that is associated with streaming users may correspond to relaxed synchronization constraints (e.g., larger lifetime and/or buffering for streams) as compared to real-time/regular mode that is associated with real-time users. In some embodiments, a participant may dynamically switch between a real-time or streaming participant.

Illustratively, the techniques described herein may be performed by hardware, software, and/or firmware, such as in accordance with hybrid real-time transport process 248, which may include computer executable instructions executed by the processor 220 (or independent processor of interfaces 210) to perform functions relating to the techniques described herein.

Specifically, according to various embodiments, a device obtains traffic for an application to be sent to a plurality of hybrid Information-Centric Networking clients. The device divides the plurality of hybrid Information-Centric Networking clients into active hybrid Information-Centric Networking clients and passive hybrid Information-Centric Networking clients, based in part on whether a given hybrid Information-Centric Networking client is sharing content with the plurality of hybrid Information-Centric Networking clients via the application. The device sends, to the active hybrid Information-Centric Networking clients, the traffic using a first transport mechanism that guarantees a level of end-to-end latency between the device and the active hybrid Information-Centric Networking clients. The device sends, to the passive hybrid Information-Centric Networking clients, the traffic using a second transport mechanism that does not guarantee the level of end-to-end latency between the device and the passive hybrid Information-Centric Networking clients.

Figure 5:
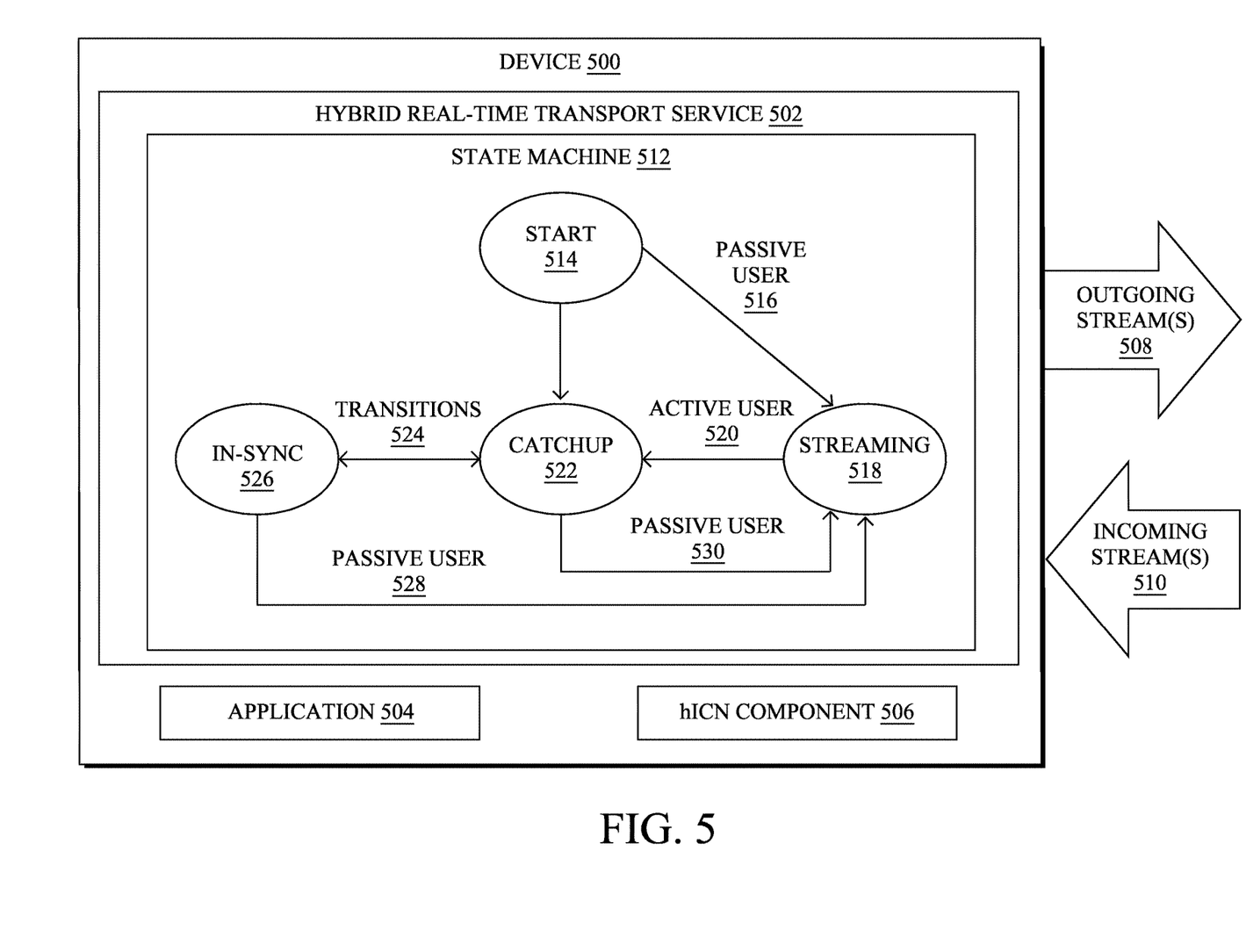
FIG. 5 illustrates an example device for RTC with low latency and high scalability.

Operationally, FIG. 5 illustrates an example device for real-time communication with low latency and high scalability, where device 500 may include hybrid real-time transport service 502 (that comprise components, hardware, software, etc. that are used to implement hybrid real-time transport process 248), application 504, and hybrid information-centric networking component 506 (that may be used to implement one or more hICN services and/or communication). Generally, as is understood in the art, device 500 may comprise a mobile device that is part of a group devices that execute application 504, where outgoing stream(s) 508 and incoming stream(s) 510 may be sent or obtained (e.g., using request(s)) in the execution/operation of application 504). For example, outgoing stream(s) 508 and incoming stream(s) 510 may comprise audio streams, video streams, presentation streams, etc.

In a hICN-RTC environment, device 500 may be configured to determine whether application 504, during its execution and/or operation, is to be considered an active participant or a passive participant (which may from time-to-time be referenced, respectively, as a real-time user or a streaming user). Generally, an active participant is when a user of device 500 is causing application 504 to share some content, information, etc. (e.g., recorded audio, a video stream, a shares screen, etc.) with other users in a hICN environment. A passive participant, on the other hand, is when a user of device 500 is not sharing content and, instead, using device 500 to receive content. For example, application 504 may include a virtual panel/group-based feature, where panelists are active participants, while members of an audience are passive participants.

It is contemplated that application 504 may offer features that allow a passive user to become an active user (e.g., when raising a virtual hand or asking a question). Application 504, along with hybrid real-time transport service 502, may be configured to monitor such scenarios and status of a user of device 500. In some embodiments, the distinction between an active participant and a passive participant may be done at the time when application 504 begins executing, and this status is locked in. Alternatively, it may be monitored actively and changed dynamically or manually configured by a user of device 500. Further, a status may change from an active participant to a passive participant if a user does not perform actions or stays idle for a predetermined amount of time.

Hybrid real-time transport service 502 may comprise a state machine 512 to determine whether a state of application 504 is to be considered an active participant or a passive participant. Generally, an active participant may be considered a real-time user, as is understood in application of hICN-RTC architecture 400. Generally, a determination as to whether a user is active or passive begins at start 514, and this may be selected by a user of application 504 or at a default starting state of application 504. For example, all members of a group session may be considered active users when application 504 begins. Alternatively, all members of a group session may be considered passive users when application 504 begins.

Generally, at a start of application 504, state machine 512 may determine that a user is to be considered a streaming user at step 516 (i.e., which may be considered a passive or "streaming" mode). In a streaming mode 518, such users are expected to tolerate additional delay in incoming stream(s) 510. In such mode, hICN communication parameters may be configured and/or requested that are based on available bandwidth for a network that device 500 is receiving content from (as opposed to it producing content like an audio or video stream). This means that, if a streaming user has enough bandwidth to follow a production rate of a producer from which the streaming user is obtaining content, this streaming user may receive the producer's content in real-time (if network conditions allow). In scenarios where the streaming user does not have enough available bandwidth, hybrid real-time transport service 502 may be configured to arrange content receiving parameters such that one or more streams may be downloaded and buffered locally (e.g., on device 500), where a user may consume the content with some delay. It is contemplated that if the available bandwidth is much smaller than a production rate of content by other devices, a delay between the content watched by the user at device 500 and its production time may become too high for requirement(s) of application 504. In these scenarios, hybrid real-time transport service 502 may present options for content to be provided at a lower resolution, bitrate, etc. to a user if device 500 (or automatically applied) so as to reduce buffering time.

As described herein above, there are scenarios where application 504 may facilitate a user of device 500 becoming an active participant (or real-time user) of application 504. State machine 512 at step 520 may be configured to monitor and detect such scenarios and cause hybrid real-time transport service 502 to be in catch-up state 522. In catch-up state 522, hybrid real-time transport service 502 may be configured to exchange transition parameters 524 so as to cause hybrid real-time transport service 502 to transition to a in-sync state 526, where application 504 is considered to be synchronized with other producer devices of a group session (according to hICN-RTC). Generally, if a device is in streaming mode 518 with enough bandwidth to support a production rate of devices that are actively sharing content, that device may be considered to be in in-sync state 526 (due to already receiving content in real-time). If this is not the case, a device in catch-up state 522 may jump some frames (in content) so that the device may quickly re-sync to be in in-sync state 526. Upon synchronization with other producer devices, a user of device 500 may be considered an active participant (or real-time user) of a given session. There are scenarios where device 500 may be configured to transition back to streaming mode 518 (from catch-up state 522 or in-sync state 526), as shown in step 528 or step 530. In these steps, hybrid real-time transport service 502 may configure incoming stream(s) 510 to be according to streaming mode 518.

Streaming mode 518 and in-sync state 526 (or real-time mode) may require different delaying requirements. In particular, active participants, as is understood in the art, require that transport layer conditions provider guaranteed minimal end-to-end latency. Contrastingly, while for passive participants, this requirement can be relaxed (i.e. do not provide the same guaranteed minimal end-to-end latency as they are for active participants). As such, transport requirements for active participants may be configured to implement and/or request forward error correction (FEC) for loss recovery, thereby reducing end-to-end latency at the cost of using additional bandwidth. Stream participants alternatively may be configured to implement a retransmission-based recovery mechanism that, while introducing some latency in certain scenarios, does not influence bandwidth as much. On the whole, then, bandwidth may be maximized on a hICN-RTC network so that it is appropriately allocated between active participants and passive participants. It is contemplated that, depending on available network resources (e.g., bandwidth), that there may be a gap between active participants and passive participants.

Figure 6:
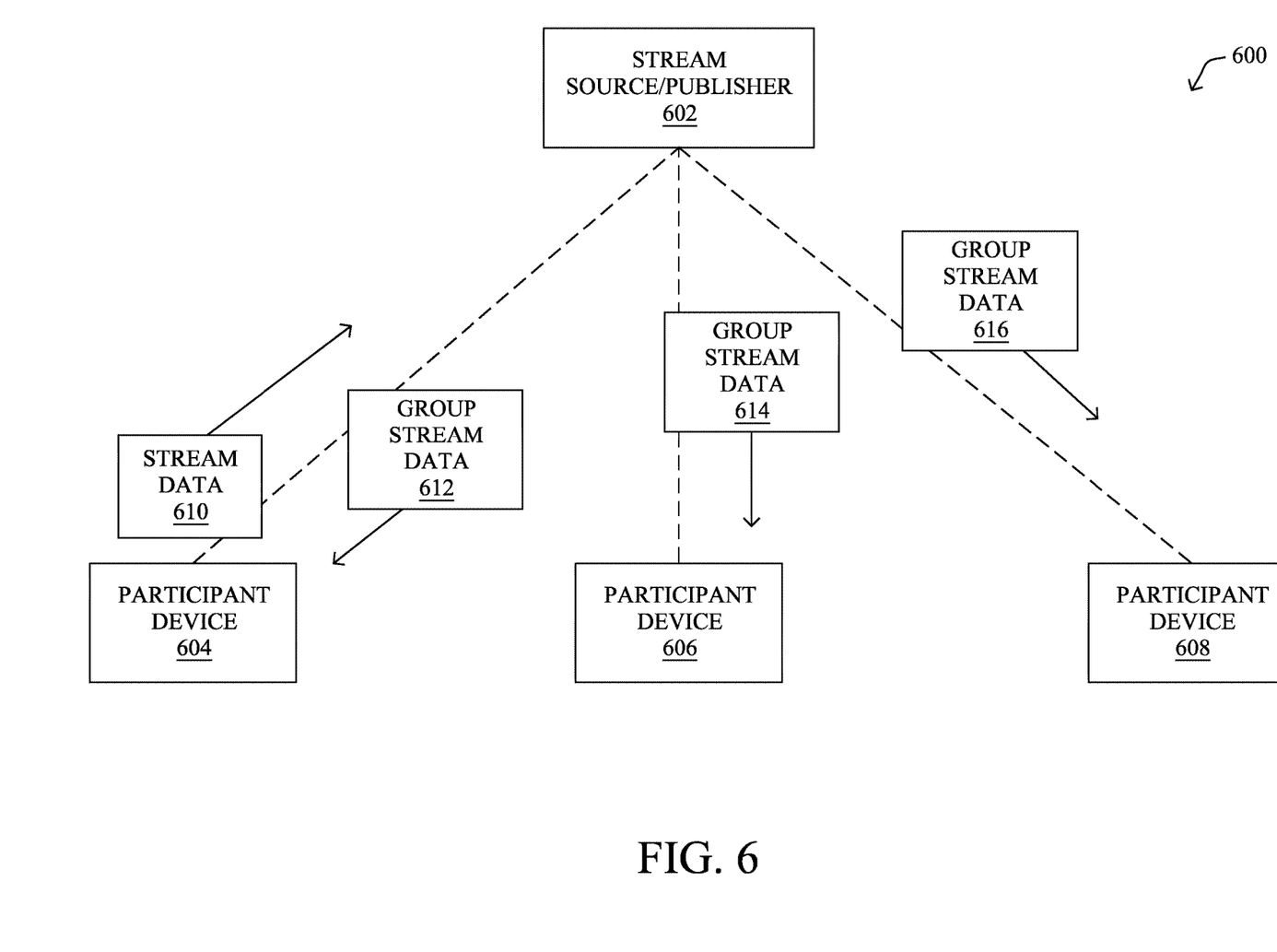
FIG. 6 illustrates an example architecture for RTC with low latency and high scalability.

Turning now to FIG. 6, FIG. 6 illustrates an example architecture for RTC with low latency and high scalability. Architecture 600 includes stream source/publisher 602 that is configured to execute a group application that may receive then retransmit one or more streams from participant devices. First participant device 604, second participant device 606, and third participant device 608, along with stream source/publisher 602, may individually execute the group application, and in certain scenarios, each of the participant devices send and/or receive streams from stream source/publisher 602. According to the techniques described herein each of the participant devices may request and/or configure transmission parameters based on where a given device is an active or passive participant. In the example shown in FIG. 6:

1) first participant device 604 may be an active participant (e.g., one that is uploading video or sharing a screen with other participant devices) and, therefore, accordingly send stream data 610 to stream source/publisher 602 to be retransmitted to other participant devices as well as obtain group stream data 612 using parameters in an in-sync state 526; and 2) second participant device 606 and third participant device 608 be passive participants (e.g., one that is only consuming a video and/or receiving a shared screen) and receive group stream data 614 and group stream data 616, respectively, from stream source/publisher 602 in a streaming mode 518.

In architecture 600, group stream data 612, group stream data 614, and group stream data 616 are effectively the same content which is received by the participant devices (in both real-time mode and streaming mode). Participant devices in architecture 600 receive the same content, that is retrieved by the same protocol, so no additional transcoding is required. Request aggregation may be used so that all participants get the same content, and, therefore, server load, for example, CPU load/usage, (e.g., at publisher 602) may proportionally grow with a number of active participants and is insensitive to a number of passive participants. Accordingly, real-time content may be distributed at large scale due to only devices requiring additional bandwidth being allocated it. Additionally, only one encoding mechanism may be required for the group stream data, so format conversion(s) at stream source/publisher 602 may not be required (which may also decrease CPU load/usage).

Figure 7:
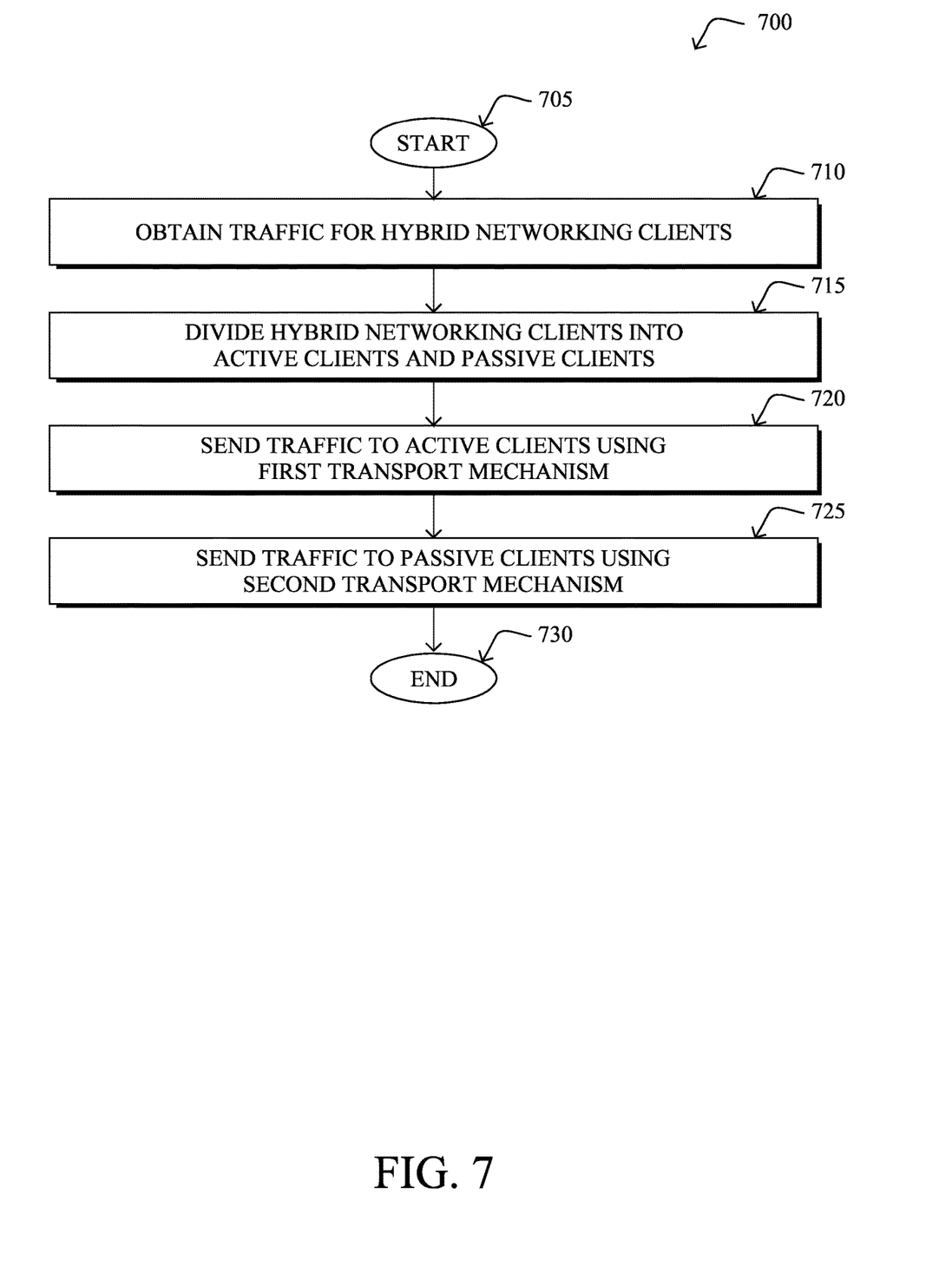
FIG. 7 illustrates an example simplified procedure for RTC with low latency and high scalability.

FIG. 7 illustrates an example simplified procedure (e.g., a method) for real-time communication (RTC) with low latency and high scalability, in accordance with one or more embodiments described herein. For example, a non-generic, specifically configured device (e.g., device 200), may perform procedure 700 by executing stored instructions (e.g., hybrid real-time transport process 248). The procedure 700 may start at step 705, and continues to step 710, where, as described in greater detail above, a device may obtain traffic for an application to be sent to a plurality of hybrid Information-Centric Networking clients. In a further embodiment, the application may comprise a video streaming or an audio streaming application.

At step 715, as detailed above, the device may divide the plurality of hybrid Information-Centric Networking clients into active hybrid Information-Centric Networking clients and passive hybrid Information-Centric Networking clients, based in part on whether a given hybrid Information-Centric Networking client is sharing content with the plurality of hybrid Information-Centric Networking clients via the application. In an embodiment, the plurality of hybrid Information-Centric Networking clients may be configured to begin execution of the application as active hybrid Information-Centric Networking clients.

At step 720, the device may send, to the active hybrid Information-Centric Networking clients, the traffic using a first transport mechanism that guarantees a level of end-to-end latency between the device and the active hybrid Information-Centric Networking clients. In an embodiment, second transport mechanism may comprise retransmission error correction. In a further embodiment, sending, by the device, the traffic may be in response to receiving a hybrid Information-Centric Networking request from a given client. In one or more embodiments, sending the traffic using the first transport mechanism that guarantees the level of end-to-end latency may be in response to detecting a given client switching from being a passive hybrid Information-Centric Networking client to an active hybrid Information-Centric Networking client.

At step 725, as detailed above, the device may send, to the passive hybrid Information-Centric Networking clients, the traffic using a second transport mechanism that does not guarantee the level of end-to-end latency between the device and the passive hybrid Information-Centric Networking clients. In an embodiment, the first transport mechanism may use more bandwidth than the second transport mechanism. In one or more embodiments, the device may receive an indication from the given client that the given client has switched to being the active hybrid Information-Centric Networking client. In a further embodiment, the traffic using the first transport mechanism and the traffic using the second transport mechanism is sent using a same encoding mechanism. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a mechanism for real-time communication (RTC) with low latency and high scalability. That is, a hICN-RTC architecture may be configured to implement a streaming mode that distinguishes between a real-time participant and a streaming participant in a given communication session using a single protocol, thereby providing scalability for sessions with both types of participants. When transport layer communications are synchronized among these types of devices, "consumer" devices receive content (e.g., streams) from "producer" devices without additional delay (apart from delay introduced by network conditions). Participant devices receive the same content, that is retrieved by the same protocol, so no additional transcoding is required. Server load, for example, CPU load/usage may proportionally grow with a number of active participants and is insensitive to a number of passive participants. Accordingly, real-time content may be distributed at large scale due to only devices requiring additional bandwidth being allocated it.

While there have been shown and described illustrative embodiments that provide real-time communication (RTC) with low latency and high scalability, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well. In addition, while certain types of network packets, protocols, etc. are discussed herein, the techniques herein may be used in conjunction with any network packets, protocols, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   obtaining, by a device, traffic for an application to be sent to a plurality of hybrid Information-Centric Networking clients;
   dividing, by the device, the plurality of hybrid Information-Centric Networking clients into active hybrid Information-Centric Networking clients and passive hybrid Information-Centric Networking clients, based in part on whether a given hybrid Information-Centric Networking client is sharing content with the plurality of hybrid Information-Centric Networking clients via the application;
   sending, by the device and to the active hybrid Information-Centric Networking clients, the traffic using a first transport mechanism that guarantees a level of end-to-end latency between the device and the active hybrid Information-Centric Networking clients; and
   sending, by the device and to the passive hybrid Information-Centric Networking clients, the traffic using a second transport mechanism that does not guarantee the level of end-to-end latency between the device and the passive hybrid Information-Centric Networking clients.

2. The method as in claim 1, wherein the first transport mechanism uses more bandwidth than the second transport mechanism.

3. The method as in claim 1, wherein the first transport mechanism comprises forward error correction.

4. The method as in claim 1, wherein the second transport mechanism comprises retransmission error correction.

5. The method as in claim 1, wherein sending, by the device, the traffic is in response to receiving a hybrid Information-Centric Networking request from a given client.

6. The method as in claim 1, wherein sending the traffic using the first transport mechanism that guarantees the level of end-to-end latency is in response to detecting a given client switching from being a passive hybrid Information-Centric Networking client to an active hybrid Information-Centric Networking client.

7. The method as in claim 6, wherein the device receives an indication from the given client that the given client has switched to being the active hybrid Information-Centric Networking client.

8. The method as in claim 1, wherein the plurality of hybrid Information-Centric Networking clients are configured to begin execution of the application as active hybrid Information-Centric Networking clients.

9. The method as in claim 1, wherein the traffic using the first transport mechanism and the traffic using the second transport mechanism is sent using a same encoding mechanism.

10. The method as in claim 1, wherein the application comprises a video streaming or an audio streaming application.

11. An apparatus, comprising:
    one or more interfaces;
    a processor coupled to the one or more interfaces and configured to execute one or more processes; and
    a memory configured to store a process that is executable by the processor, the process when executed configured to:
      obtain traffic for an application to be sent to a plurality of hybrid Information-Centric Networking clients;
      divide the plurality of hybrid Information-Centric Networking clients into active hybrid Information-Centric Networking clients and passive hybrid Information-Centric Networking clients, based in part on whether a given hybrid Information-Centric Networking client is sharing content with the plurality of hybrid Information-Centric Networking clients via the application;
      send, to the active hybrid Information-Centric Networking clients, the traffic using a first transport mechanism that guarantees a level of end-to-end latency between the apparatus and the active hybrid Information-Centric Networking clients; and
      send, to the passive hybrid Information-Centric Networking clients, the traffic using a second transport mechanism that does not guarantee the level of end-to-end latency between the apparatus and the passive hybrid Information-Centric Networking clients.

12. The apparatus as in claim 11, wherein the first transport mechanism uses more bandwidth than the second transport mechanism.

13. The apparatus as in claim 11, wherein the first transport mechanism comprises forward error correction.

14. The apparatus as in claim 11, wherein the second transport mechanism comprises retransmission error correction.

15. The apparatus as in claim 11, wherein to send the traffic is in response to receiving a hybrid Information-Centric Networking request from a given client.

16. The apparatus as in claim 11, wherein to send the traffic using the first transport mechanism that guarantees the level of end-to-end latency is in response to detecting a given client switching from being a passive hybrid Information-Centric Networking client to an active hybrid Information-Centric Networking client.

17. The apparatus as in claim 16, wherein the apparatus receives an indication from the given client that the given client has switched to being the active hybrid Information-Centric Networking client.

18. The apparatus as in claim 11, wherein the plurality of hybrid Information-Centric Networking clients are configured to begin execution of the application as active hybrid Information-Centric Networking clients.

19. The apparatus as in claim 11, wherein the traffic using the first transport mechanism and the traffic using the second transport mechanism is sent using a same encoding mechanism.

20. A tangible, non-transitory, computer-readable medium storing program instructions that cause a device to execute a process comprising:
- obtaining, by the device, traffic for an application to be sent to a plurality of hybrid Information-Centric Networking clients;
- dividing the plurality of hybrid Information-Centric Networking clients into active hybrid Information-Centric Networking clients and passive hybrid Information-Centric Networking clients, based in part on whether a given hybrid Information-Centric Networking client is sharing content with the plurality of hybrid Information-Centric Networking clients via the application;
- sending, to the active hybrid Information-Centric Networking clients, the traffic using a first transport mechanism that guarantees a level of end-to-end latency between the device and the active hybrid Information-Centric Networking clients; and
- sending, to the passive hybrid Information-Centric Networking clients, the traffic using a second transport mechanism that does not guarantee the level of end-to-end latency between the device and the passive hybrid Information-Centric Networking clients.

* * * * *